Jan. 1, 1946. J. W. ALEXANDER 2,392,110
SUPPORT
Filed April 11, 1944
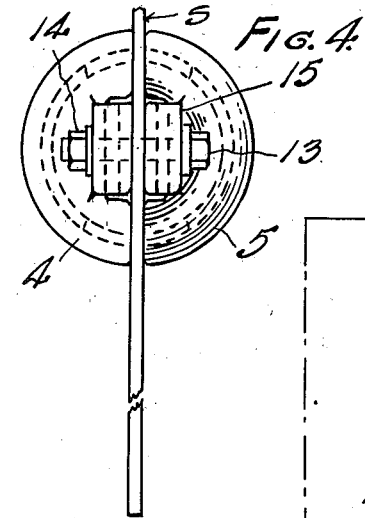
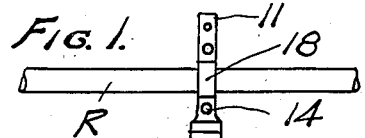
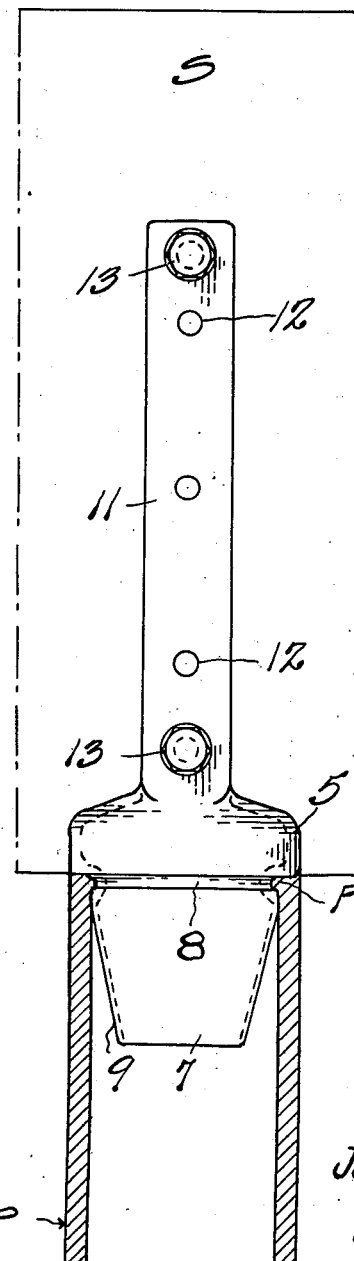
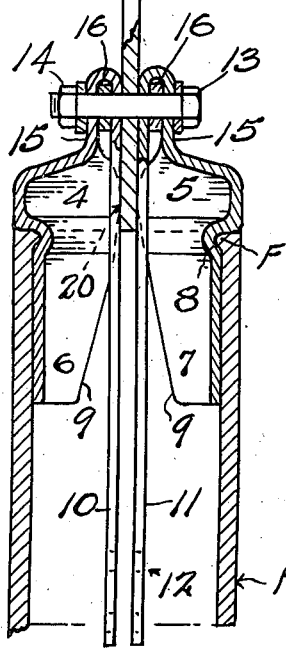
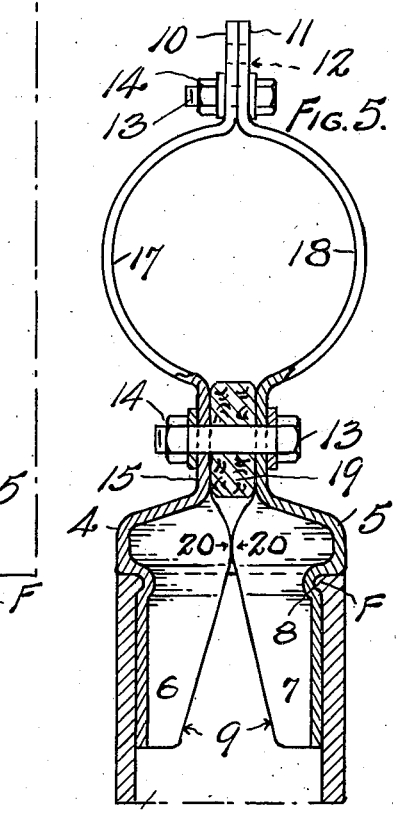
INVENTOR.
John W. Alexander
BY
Chas. K. Davies
Atty.

Patented Jan. 1, 1946

2,392,110

UNITED STATES PATENT OFFICE 2,392,110

SUPPORT

John W. Alexander, Arlington, Va.

Application April 11, 1944, Serial No. 530,442

5 Claims. (Cl. 248—229)

My present invention relates to improvements in the general class of supports, employing a novel form of bracket utilized in connection with a fixed post or similar support, a movable standard or column, and other similar devices, for supporting a flat sign or similar object in a vertical plane; a horizontal pipe, cable, cord, rail, or rod, as used in a fence or other barrier; as well as for other objects mounted upon a suitable support.

In the accompanying drawing I have illustrated the novel form of bracket for mounting a sign upon either a fixed post or a movable standard or column, for use as a street or highway sign; and the bracket is also illustrated as performing the function of supporting a horizontal barrier, as for instance, a fence rail or bar, mounted upon a fixed support or upon a movable support. It will be understood, however, that the novel bracket of my invention is capable of other uses for various purposes, and designed for adaptation to different supports for holding numerous other objects.

The primary object of my invention is the provision of a detachable and separable bracket for use with its support in mounting an object or structure rigidly upon its support in proper position for use. Due to the use of a minimum number of standard parts the bracket may readily be mounted for use, and when necessary the bracket may with facility be detached from its support and the supported object or structure, as for instance for the purpose of interchanging signs, repairs, and replacement of parts. The standardized, duplicated parts of the separable bracket are preferably stamped or pressed from metal blanks of resilient, flexible, or pliant material, or they may be fashioned in other suitable manner.

In carrying out my invention I employ a bracket including two clamp members, each of which is provided with a clamp-jaw, an anchoring leg, and an attaching arm, with the leg preferably disposed at an angle to its jaw so that the two sections or members of the bracket are capable of a complementary pivotal movement while seating or unseating the bracket with relation to its tubular support.

In the accompanying drawing I have illustrated one complete example of the physical embodiment of my invention, and disclosed three modes of embodying the bracket in actual use. While the parts forming my invention have been combined and arranged according to these modes, it will be understood that in other practical applications of the principles of my invention various changes and alterations may be made in the invention as exemplified in the drawing, within the scope of my claims, without departing from the principles of the invention.

Figure 1 is a small scale elevation of the device of my invention embodied in a vertical standard or post, which may be either movable or fixed, and supporting a horizontal pipe-rail or similar object.

Figure 2 is an enlarged view of the device supporting a portion of a flat sign, and seated in the top of a post having a tubular seat.

Figure 3 is a vertical sectional view, in a plane at ninety degrees from the plane of Figure 2, illustrating another mode of adapting the bracket to a flat sign or similar object.

Figure 4 is a top plan view of the structure in Figure 3.

Figure 5 is a sectional view in the same plane as Figure 3, but with the bracket arms extended or projected, and rounded for use as a clamp.

In the drawing the letter S indicates a sign which may be of flat metal, or other suitable material, as used for instance upon streets or highways, and in other positions for displaying information. The letter R indicates a horizontally disposed rail, rod, cable, pipe cord, or similarly shaped object, which is supported through the instrumentality of the bracket; and the letter P designates a post that may be in the nature of a pipe, or a solid post with a tubular seat, and this post may be a fixed support or a movable standard or column.

The tubular seat in the upper end of the post is preferably fashioned with an interior, annular retaining flange F at its upper circular edge, which flange in some instances may be formed by the operation of a rotary metal cutter, as it revolves about the tubular seat, cutting from the exterior of the cylindrical end to its interior, and forming an inturned, annular burr.

The upper circular end of the cylindrical seat or support is squared, in order that the lower edge of the sign S may rest solidly upon two points or supports to aid in holding the bracketed sign against wobbling.

For clamping the object and firmly attaching it to its seat in the upper portion of the post, I employ a bracket that includes two duplicate, separable, standardized sections, each of which is fashioned with a clamp jaw, as 4 and 5 respectively. These jaws are semi-circular in cross section, and together they form a rounded or circular hollow head seated on the upper squared edge or top of the tubular seat, the exterior diameter of the head being approximately the same as the periphery of the tubular seat.

Each jaw is fashioned with an integral, semi-circular, depending, leg as 6 and 7, forming an annular anchor for the bracket and seated within the tubular support, and between complementary jaws and legs exterior annular grooves 8 are fashioned for contact with the annular flange F at the upper edge of the tubular seat.

It will be noted that the legs 6 and 7 are cut away at 9, 9, and that these opposed edges in Figures 3 and 5 are disposed at an acute angle. This angular arrangement of adjoining edges 9, 9 of the complementary legs, permits the legs to be contracted or brought together for ready insertion of the bracket into its supporting seat, and also permits facile withdrawal of the bracket from its seat, when necessary. When the bracket is seated in its support the legs are in spread position with their outer peripheries in close contact with the inner bore of the seat.

Each bracket section is fashioned with a preferably flat, integral, extension as 10 and 11, which form complementary spaced arms of the bracket-head, and bolt holes 12 are fashioned in these arms at suitable locations and distances apart.

In the mode of use illustrated in Figure 2 the sign S is resting with its bottom edge on the squared top of the post P, and it is clamped between the jaws 4 and 5, the two spaced arms 10 and 11 extending upwardly at opposite sides of the sign. Two spaced bolts 13, 13, are passed through registering holes 12 in the arms and the intermediate sign, and nuts 14, as seen in Figures 3 and 5, rigidly clamp the sign in fixed position.

In Figure 3, where it is undesirable that the arms appear against the faces of the sign, the integral arms of resilient, flexible, or pliant material, have each previously, been turned in, or bent to position parallel with its integral leg, for insertion with the legs into the tubular seat. This bent arrangement provides a shank portion 15, 15, one for each arm, and the two shanks, the sign S, and the portions of the arms contacting opposite sides of the sign, are provided with registering holes for the bolt 13. Washers, as 16, may be placed on the bolt between each shank and its adjoining arm-portion, and a nut 14 is turned tight on the bolt to rigidly clamp the sign in fixed position. The upper ends of the inturned, perforated, arms 10, 11, are clamped flat against the sign S, and these inner perforated portions of the arms, together with the outer shanks 15, 15, provide a wide and stable support for the bolt 13, to insure a rigid and durable clamp.

In Figures 1 and 5 the two pliant, resilient arms 10, 11 are each fashioned with semi-circular bands as 17 and 18, to form an encircling clamp yoke or ring about the pipe or round rail R in Figure 1. In this arrangement the lower bolt is pasesd through holes in the spaced shanks and also through a block, washer, or other filler 19, and the nut 14 not only holds the anchoring legs spread apart in operative position as also disclosed in Figure 3, but in addition it aids the upper clamp bolt in rigidly mounting the band 17—18 on the object clamped.

In each adaptation of the invention a rocking or pivotal arrangement is provided just above the top of the seat for the bracket so that the clamp bolt adjacent the head performs the dual function of spreading and anchoring the legs in the seat of the support and simultaneously clamping the object in the bracket. Two pairs of opposed rounded fulcrums 20, 20, in the head which merge with the angular edges 9 of the legs provide for the rocking or pivotal movement of the bracket-sections.

In Figure 3 these rocking fulcrums, as indicated by dotted lines, contact with opposite sides of the thin flat sign-plate; and in Figure 5 the two pairs of rocking fulcrums 20, 20 contact with one another.

The spacers, filler blocks, or washers, may be of soft pads, depending upon the amount of adjustment required for the main clamping bolt and nut in fixing the bracket and securing the object clamped thereby. In some instances, the upper bolt in Figure 5 may be omitted if desirable, and the resiliency of the bent arms relied upon for clamping an object; and in other arrangements, the filler block 19 may also be omitted in adapting the bracket to a specific object. In the arrangement of Figure 3, the washers 16 may also be dispensed with and the clamp bolt passed through the alined openings or holes in the shanks and bent arms. These and other changes and modifications may be made without departing from the principles of my invention.

Having thus fully described my invention, what I claim as new and desire to secure by Letters Patent is:

1. A bracket comprising a pair of separable sections each including an anchoring leg, a hollow jaw, and an arm; said jaws forming an enlarged supporting head and means for clamping an object between the jaws; said legs being arcuate in cross section and having adjoining pairs of acutely disposed edges, and said edges and jaws terminating in two spaced pairs of abutting fulcrum points, whereby said clamping means performs the dual functions of spreading the legs and simultaneously clamping an object.

2. A bracket comprising a pair of separable sections each including an anchoring leg, a hollow jaw, and an arm; said jaws forming an enlarged supporting head and means for clamping an object between the jaws, and co-acting fulcrum-means on said jaws merging with the legs whereby the clamping means performs the dual functions of spreading the legs and simultaneously clamping an object between the sections.

3. A bracket comprising a pair of separable sections each including an anchoring leg, a clamping jaw and a perforated, resilient pliant inturned arm having a shank portion; a bolt passed through alined holes in the arms and shanks and a nut on the bolt; and co-acting fulcrums on said sections whereby the bolt and nut perform the dual functions of anchoring the legs and simultaneously clamping an object between the sections.

4. A bracket comprising a pair of separable sections each including an anchoring leg arcuate in cross section, a semi-circular clamping jaw, and a resilient bowed arm, said bowed arms together forming a clamping yoke; a bolt passing through holes in said arms and a clamp nut on the bolt; said jaws forming a hollow circular supporting head and co-acting fulcrums on said jaws merging with the legs whereby the bolt and nut perform the dual functions of anchoring the legs and simultaneously clamping an object between said bowed arms.

5. The combination with a tubular support, of a pair of bracket-sections each including a jaw, an anchoring leg, and a bowed pliant arm; said jaws forming an enlarged circular supporting head seated on the support and said legs forming a tubular anchor projecting within the support; a bolt passed through alined holes in the arms and a clamp nut on the bolt; and co-acting fulcrums on said jaws whereby the bolt and nut perform the dual functions of anchoring the legs in the support and simultaneously clamping an object between the bowed arms.

JOHN W. ALEXANDER.